May 28, 1935.  B. JENKINS  2,003,198

CLUTCH BRAKE

Filed Dec. 18, 1933 2 Sheets-Sheet 1

Bryan Jenkins
INVENTOR

BY Victor J. Evans & Co.
ATTORNEYS

May 28, 1935.  B. JENKINS  2,003,198
CLUTCH BRAKE
Filed Dec. 18, 1933   2 Sheets-Sheet 2

Bryan Jenkins
INVENTOR
BY Victor J. Evans & Co.
ATTORNEYS

Patented May 28, 1935

2,003,198

UNITED STATES PATENT OFFICE 2,003,198

CLUTCH BRAKE

Bryan Jenkins, Flemington, W. Va.

Application December 18, 1933, Serial No. 702,991

2 Claims. (Cl. 188—72)

This invention relates to brakes especially adapted for motor vehicles and has for the primary object the provision of a device of the above stated character which is of the internal type and is so constructed that the brake shoe when in brake applying position, the force thereof against the brake drum will be in a direction to force the wheel onto its axle instead of off of the axle and thereby eliminate the possibility of accidents should the retaining means of the wheel to the axle become defective or lost and further the construction of the present invention will provide maximum braking surface and will be free of noises and of rattling.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a fragmentary vertical sectional view illustrating a brake constructed in accordance with my invention and showing the same applied to an axle and the wheel of said axle.

Figure 1:
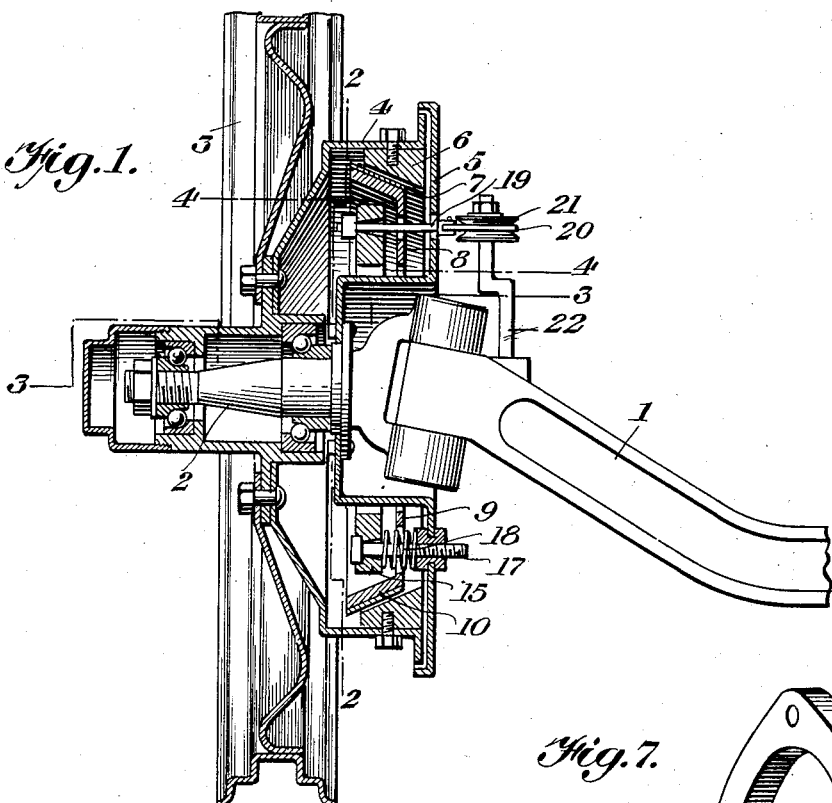
Figure 7:
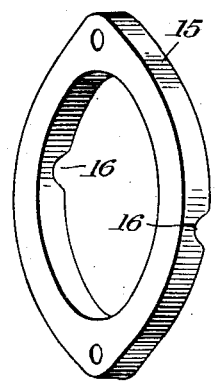
Figure 7 is a perspective view illustrating the brake shoe applying medium.
Figure 2:
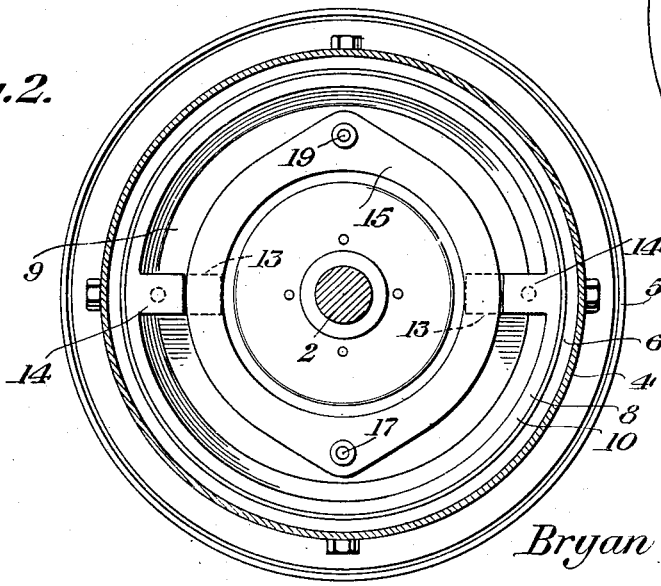
Figure 2 is a sectional view taken on the line 2—2 of Figure 1.
Figure 3:
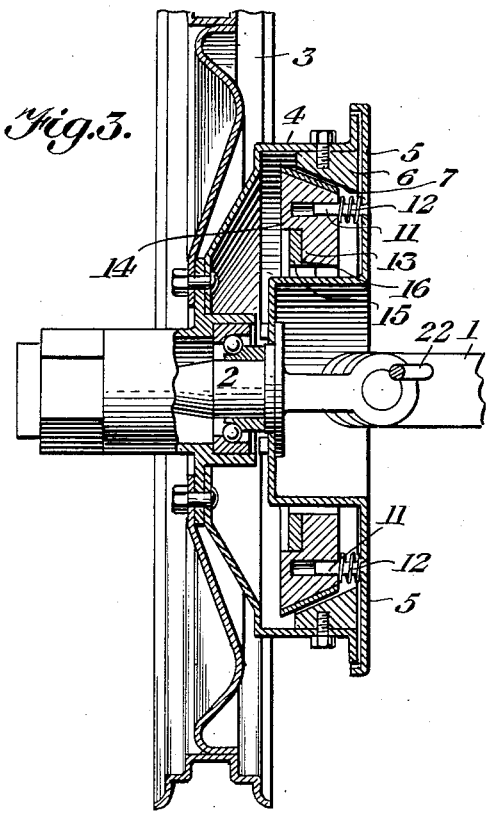
Figure 3 is a sectional view taken on the line 3—3 of Figure 1.
Figure 4:
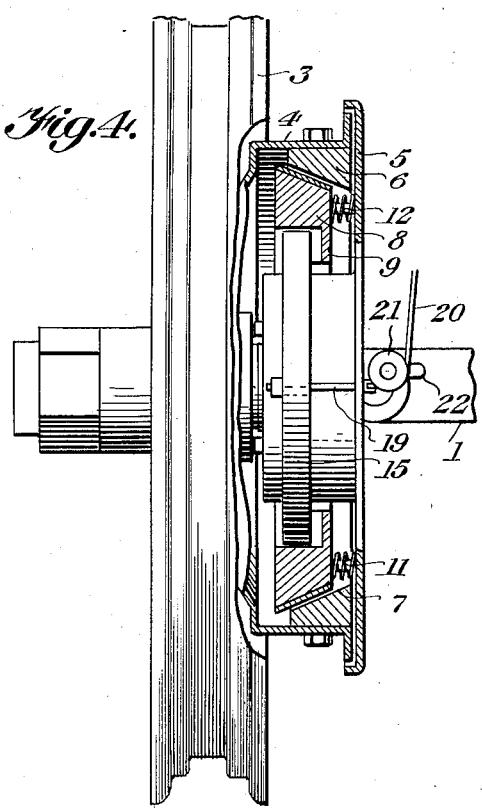
Figure 4 is a sectional view taken on the line 4—4 of Figure 1.
Figure 5:
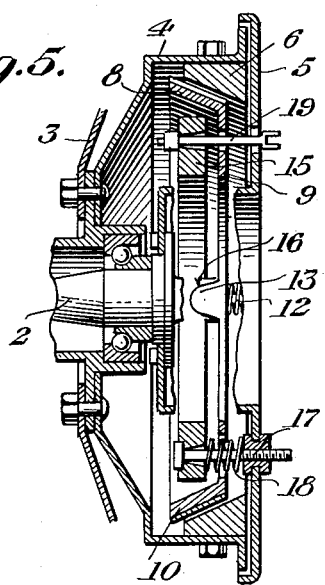
Figure 5 is an enlarged fragmentary sectional view showing the brake shoe operating mechanism.
Figure 6:
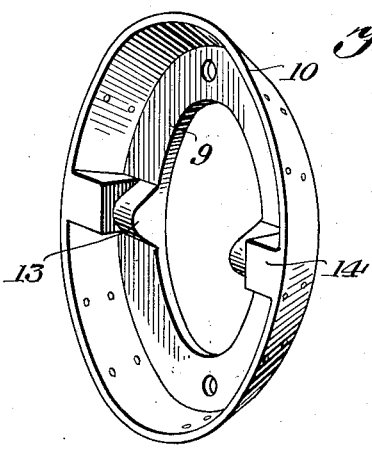
Figure 6 is a perspective view illustrating the brake shoe.

Referring in detail to the drawings, the numeral 1 indicates an axle having a spindle 2 on which is journaled a wheel 3 carrying a brake drum 4. The drum 4 is closed by a housing 5 secured to the spindle. Secured to the inner face of the brake drum 4 is a wear plate 6 of annular formation having a substantially conical-shaped brake shoe engaging face 7. The brake shoe engaging face 7 tapers away from the wheel and in the direction of the axle 1 to be engaged by a brake shoe 8, the latter consisting of a centrally apertured disc 9 formed integrally with a substantially conical-shaped flange 10 to which a suitable brake lining is riveted or otherwise secured. The brake shoe 8 is slidably supported on pins 11 carried by the housing 5 and interposed between the latter and the brake shoe on the pins are coiled springs 12 acting to normally urge the brake shoe away from the conical face 7 of the wear plate 6 of the brake drum. One face of the disc 9 of the brake shoe has formed thereon pivot lugs 13 terminating in enlargements 14 formed integrally with the flange 10. An annular brake applying member 15 is provided with recesses 16 to receive the pivot lugs 13 and also engage the enlargements 14 to prevent shifting of the member 15 within the brake shoe. The member 15 is apertured to receive a guide bolt 17 adjustably secured to the housing 5 with the head of said bolt fitting in a recess in the member 15. The member 15 is capable of a limited rocking movement on the bolt 17. To retain the member 15 in engagement with the head of the bolt a spring 18 of the coil type is interposed between the member 15 and the mounting of the bolt to the housing 5. An operating rod 19 is secured to the member 15 opposite to the location of the bolt 17 and extends through an opening in the housing 5 for connection to an operating cable 20 trained over a pulley 21 carried by an arm 22 secured to the axle 1. The tensioning of the cable will draw the member 15 in one direction and through its pivotal connection with the brake shoe will cause the latter to bear with considerable force against the wear plate 6 of the brake drum and thereby retard the rotation of the wheels. The force of the brake shoe against the brake drum is in a direction away from the wheel. This force has a tendency to urge the wheel onto the spindle 2.

Having described the invention, I claim:

1. A brake comprising a drum secured to a wheel and having a tapering face with the taper of said face extending away from the wheel, a housing for said drum, a brake shoe slidably supported by said housing and having a conical-shaped flange to engage with the tapering face of the drum whereby braking force therefrom acts to retain the wheel on its support, pivot lugs on the shoe, an annular member having recesses to receive the pivot lugs, means for limiting the pivotal movement of the member with respect to the shoe, and an operating means connected to the member.

2. A brake comprising a drum secured to a wheel and having a tapering face with the taper of said face extending away from the wheel, a housing for said drum, a brake shoe slidably supported by said housing and having a conical-shaped flange to engage with the tapering face of the drum whereby braking force therefrom acts to retain the wheel on its support, pivot lugs on the shoe, an annular member having recesses to receive the pivot lugs, means for limiting the pivotal movement of the member with respect to the shoe, and an operating rod connected to an operating cable.

BRYAN JENKINS.